United States Patent
Washio et al.

(10) Patent No.: US 6,647,155 B2
(45) Date of Patent: *Nov. 11, 2003

(54) INCLINATION CORRECTION DEVICE AND IMAGE READING APPARATUS THEREWITH

(75) Inventors: Koji Washio, Hachioji (JP); Hideki Morita, Hachioji (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,943

(22) Filed: Jul. 27, 1999

(65) Prior Publication Data

US 2003/0038986 A1 Feb. 27, 2003

(30) Foreign Application Priority Data

Aug. 7, 1998 (JP) .......................................... 10-224330

(51) Int. Cl.[7] ................................................. G06K 9/32
(52) U.S. Cl. ........................ 382/293; 382/300; 358/525
(58) Field of Search ................................ 382/293, 294, 382/295, 296, 300, 302; 399/371, 372, 394; 358/488, 496, 505, 525, 498

(56) References Cited

U.S. PATENT DOCUMENTS

| | | | | |
|---|---|---|---|---|
| 5,149,977 A | * | 9/1992 | Mita | 250/556 |
| 5,191,438 A | * | 3/1993 | Katsurada et al. | 358/426 |
| 5,233,168 A | | 8/1993 | Kulik | |
| 5,373,371 A | * | 12/1994 | Masui | 358/444 |
| 5,668,638 A | * | 9/1997 | Knox | 358/298 |
| 5,668,898 A | * | 9/1997 | Tatsuta | 382/290 |
| 5,854,964 A | * | 12/1998 | Atsumi | 399/371 |
| 6,067,168 A | * | 5/2000 | Nishiyama et al. | 358/1.16 |
| 6,097,855 A | | 8/2000 | Levien | |
| 6,301,022 B1 | * | 10/2001 | Washio et al. | 358/488 |

FOREIGN PATENT DOCUMENTS

| | | |
|---|---|---|
| EP | 0 708 551 A2 | 4/1996 |
| EP | 0 869 659 A2 | 10/1998 |
| JP | 57-182875 | 11/1982 |
| JP | 10-336425 | 12/1998 |

* cited by examiner

Primary Examiner—Bhavesh M. Mehta
Assistant Examiner—Kanji Patel
(74) Attorney, Agent, or Firm—Frishauf, Holtz, Goodman & Chick, P.C.

(57) ABSTRACT

An inclination correction device for correcting an inclination of an image caused when the image is read while the image is inclined from a main scanning direction in an image reading apparatus which scans the image in the main scanning direction and in a sub-scanning direction, by shifting processing to shift the image at least in one direction, wherein there is provided an interpolation processing device which corrects an error that is smaller than a pixel unit and is caused in the shifting processing through interpolation processing.

4 Claims, 8 Drawing Sheets

BEFORE CORRECTION

FIG. 5(b)

AFTER CORRECTION

BEFORE CORRECTION    AFTER CORRECTION

FIG. 12

INCLINATION CORRECTION DEVICE AND IMAGE READING APPARATUS THEREWITH

BACKGROUND OF THE INVENTION

The present invention relates to an image data processing device, especially to a device to correct an inclination of an image, and more particularly, to an inclination correction device which can correct an inclination of an image that is caused when the image is inclined to an image reading means when being read in the course of reading and can output a non-inclined image, and to an image reading apparatus having therein the inclination correction device. The invention can be used for a scanner, a facsimile machine and a digital copying machine.

As a method of processing to correct an inclination of an original document for forming a non-inclined image by correcting image data obtained through reading an inclined original document in the course of image reading by scanning the original document in the main scanning direction and in the sub-scanning direction, there is one wherein image data are taken as an aggregate of linear data in the main scanning direction or an aggregate of linear data in the sub-scanning direction, and a shifting processing which shifts in the main scanning direction the linear data in the main scanning direction constituting an image, and a shifting processing which shifts in the sub-scanning direction the linear data in the sub-scanning direction are combined.

Incidentally, in the following explanation, the main scanning direction is expressed as a lateral direction, processing to shift in the main scanning direction is expressed as lateral shifting processing, while the sub-scanning direction is expressed as a longitudinal direction, processing to shift in the sub-scanning direction is expressed as longitudinal shifting.

The applicant of the invention has filed an application of TOKKAIHEI NO. 10-336425 concerning how to correct an inclination of an image through the shifting processing mentioned above.

Since processing is conducted for each linear data in this method, it is possible to limit the circuit size to be relatively small, compared with a method to conduct processing for each pixel like affine transformation, and high speed processing is expected.

Though a quantity of shifting in shifting processing is originally expressed by real numbers, actual shifting is conducted on a unit of a pixel, namely on a unit of an integer. Eventually, an error which is smaller than a decimal fraction is generated. Accordingly, there has been a problem of deterioration of image quality, including that fine lines are serrated.

For the image data transmitted on a serial basis, a memory for plural lines corresponding to the inclination angle is needed in the aforesaid shifting processing, and a capacity of the memory corresponds to the product of the number of pixels for plural lines and the number of bits of the pixel. When an 8-bit pixel is assumed, necessary memory capacity is made greater, resulting in a problem in practical use.

Therefore, an object of the invention is to solve the problems stated above in the inclination correction processing for an original document, and to provide an inclination correction device and an image reading apparatus wherein deterioration of image quality is prevented and an increase of the memory capacity is controlled.

The objects of the invention mentioned above can be attained by either one of the following structures.

Structure 1

An inclination correction device for correcting an inclination of an image caused when the image is read while it is inclined from the main scanning direction in an image reading apparatus which scans the image in the main scanning direction and in the sub-scanning direction, by shifting processing to shift the image in at least one direction, wherein there is provided an interpolation processing means which corrects an error that is smaller than a pixel unit and is caused in the shifting processing through interpolation processing.

Structure 2

An inclination correction device for processing image data inputted on a serial basis and for correcting an inclination of an image caused when the image is read while it is inclined from the main scanning direction in an image reading apparatus which scans the image in the main scanning direction and in the sub-scanning direction, by shifting the image at least in the sub-scanning direction, wherein there is provided a multiple coding means for reducing the bit number of a pixel value which operates prior to the shifting processing for shifting the image in the sub-scanning direction.

Structure 3

An image reading apparatus having therein an image reading means for reading an image of an original document by scanning the image in the main scanning direction and in the sub-scanning direction and an image processing means for processing image data inputted from the image reading means and thereby for outputting image data for image forming, wherein the image processing means has therein an inclination correction means for correcting an inclination of an image through shifting processing to shift an image at least in one direction, and the inclination correction means has an interpolation processing means for correcting an error that is smaller than a pixel unit and is caused in the shifting processing.

Structure 4

An image reading apparatus having therein an image reading means for reading an image of an original document by scanning the image in the main scanning direction and in the sub-scanning direction and an image processing means for processing image data inputted from the image reading means on a serial basis and thereby for outputting image data for image forming, wherein the image processing means has therein an inclination correction means for conducting shifting processing to shift an image inclination at least in the sub-scanning direction, and the inclination correction means has a multiple coding means for reducing the bit number of a pixel value, and multiple coding processing by the multiple coding means is conducted prior to the shifting processing for shifting an image in the sub-scanning direction.

BRIEF DESCRIPTION OF THE DRAWINGS

Each of FIGS. 3(*a*)–3(*d*) is a diagram showing illustratively lateral shift processing and longitudinal shift processing.

Each of FIGS. 5(a) and 5(b) is a diagram showing illustratively lateral shift processing.

Each of FIGS. 6(a), 6(b) and 6(c) is a diagram showing illustratively the lateral shift processing on a pixel unit.

Each of FIGS. 11(a) and 11(b) is a diagram showing illustratively longitudinal interpolation processing.

DETAILED DESCRIPTION OF THE PREFERRED EMBODIMENT (1) Image Reading Apparatus

A digital copying machine wherein an image reading apparatus related to an embodiment of the invention will be explained as follows, referring to the drawings. In the digital copying machine, an image reading means of the image reading apparatus, namely, an image sensor is provided inside a copying machine main body constituting an image forming section of the copying machine, while, an original document conveyance device of the image reading apparatus is formed to be a unit separate from the copying machine main body to be mounted thereon.

Figure 1:
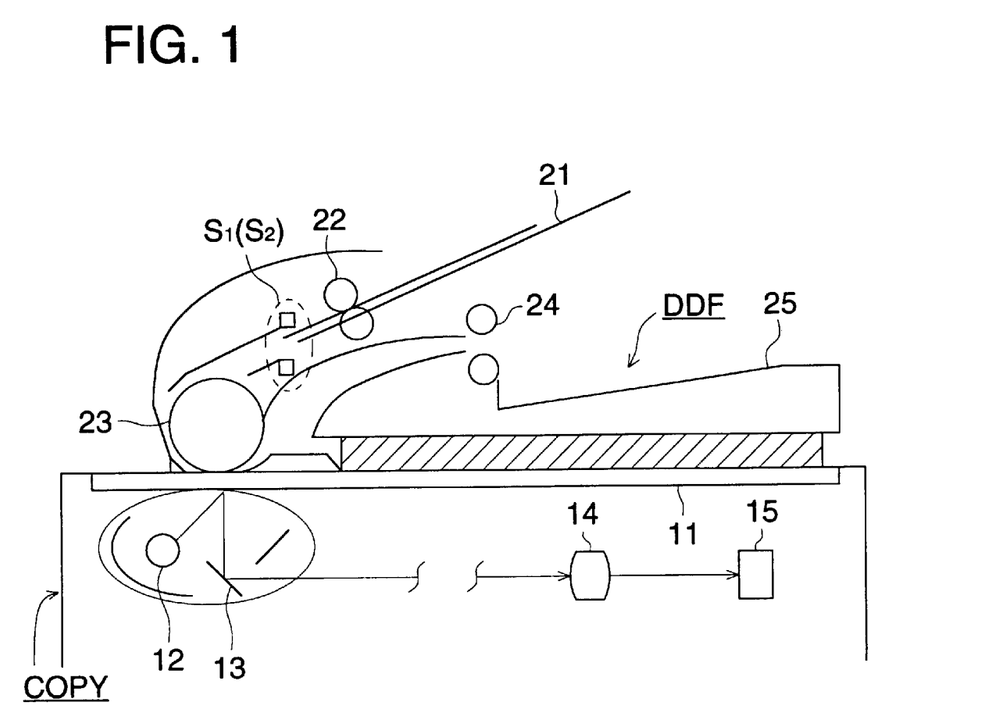
FIG. 1 is a diagram showing a schematic mechanical structure of an image reading apparatus related to an embodiment of the invention.

FIG. 1 is a diagram showing the mechanical structure of a digital copying machine wherein an image reading apparatus related to the present embodiment is incorporated.

Original document conveyance device DDF is formed to be a unit separate from copying machine main body COPY, and is mounted on the copying machine main body COPY. The numeral 11 represents an original document platen which forms a path and an illuminating position for the original document when the moving original document is read. Light emitted from light source 12 is reflected on the original document, and passes through mirror 13 and image forming lens 14 to enter line sensor 15 which is composed of CCD.

Original document conveyance device DDF is composed of sheet-feeding tray 21 on which an original document is placed, sheet-feeding roller 22 which conveys original documents placed on the sheet-feeding tray 21 one by one, roller 23 which conveys an original document conveyed by the sheet-feeding roller 22 to the reading position and conveys in the constant direction at the reading position, sheet-ejecting roller 24 which ejects an original document conveyed by the roller 23, and sheet-ejecting tray 25 on which the ejected sheet is placed, and an original document on the sheet-feeding tray 21 is separated by the sheet-feeding roller 22 into one, and passes through the roller 23 and the sheet-ejecting roller 24 to be ejected on the sheet-ejecting tray 25.

An original document which passes through the reading position formed by the original document platen 11 and the roller 23 is scanned by the line sensor 15 in the main scanning direction representing the direction of the line and in the sub-scanning direction representing the moving direction of the original document, and thus, image reading in the original document moving system is conducted.

In the present embodiment, image reading in the original document stationary system can also be conducted. Namely, it is also possible to conduct image reading for an original document placed on the original document platen 11 by moving light source 12 and mirror 13.

On the original document conveyance device DDF, sensors $S_1$ and $S_2$ each being composed of a light projector and a light interceptor which detect passage of an original document right behind the sheet-feeding roller 22 are provided on both sides of an original document conveyance path to be perpendicular to the original document conveyance direction. The sensors $S_1$ and $S_2$ represent sensors which detect an angle of the leading edge of an original document conveyed through the original document conveyance path, namely, these sensors detect skewing of the original document running in the original document conveyance device DDF. Incidentally, as a sensor to detect skewing of an original document, any type of the known sensors may be used.

Figure 2:
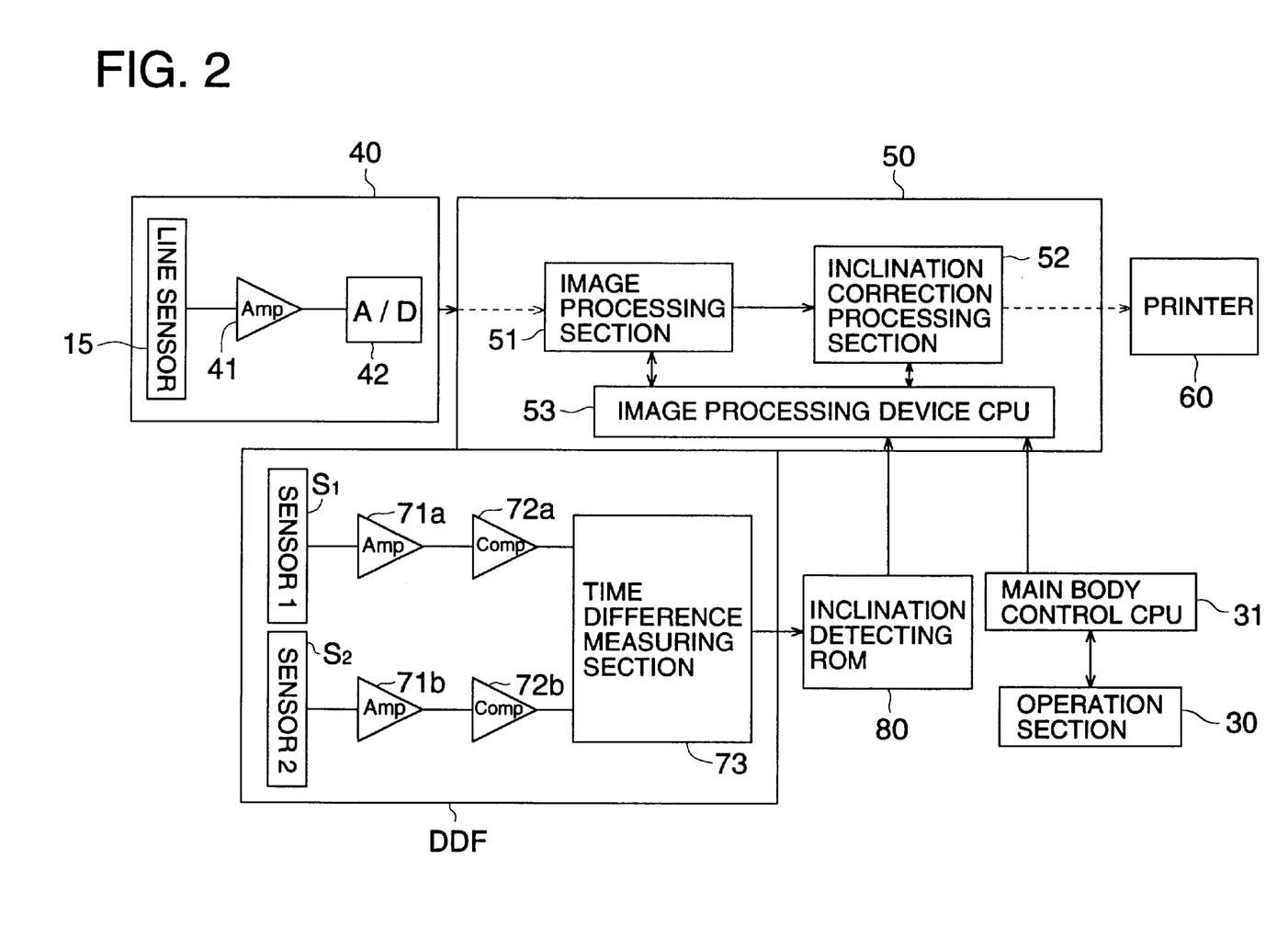
FIG. 2 is a diagram showing an electrical structure of an image reading apparatus shown in FIG. 1.

FIG. 2 shows an electrical structure of an image reading apparatus related to the present embodiment. In FIG. 2, scanner 40 having line sensor 15 is provided with amplifier 41 and A/D converter 42, and image processing device 50 which processes image signals coming from the scanner 40 is composed of image processing section 51, inclination correction processing section 52 and image processing device CPU which conduct, for each pixel from the scanner 40, the filtration processing and variable power processing for image data representing data for one line of main scanning outputted on a serial basis successively in the sub-scanning direction. The original document conveyance device DDF is provided with sensors $S_1$ and $S_2$, amplifiers 71a and 71b which amplify output of the sensors, comparators 72a and 72b which compare output of the amplifiers 71a and 71b with threshold values and thereby output signals corresponding to the time for the leading edge of an original document to pass, and time difference measuring section 73 which calculates the time difference between output of the comparators 72a and 72b.

In the original document conveyance device DDF, information of inclination angle θ of an original document conveyed is detected by each of the sensors $S_1$ and $S_2$, and time difference s is calculated in the time difference measuring section 73. When assuming that a distance between the sensors $S_1$ and $S_2$ is represented by d and conveyance speed for an original document is represented by v, inclination angle θ is expressed as follows.

$$\theta = \tan^{-1}(s \cdot v/d)$$

The relations of time difference s, inclination angle θ, stair H and stair V both expressed with the following expressions are stored in inclination detecting ROM.

stair $H = (int)(1/\tan \theta)$ stair $V = (int)(1/\tan \delta)$

In the above expressions, (int) means that decimal fractions are cut to make an integer, and δ is an angle obtained by converting inclination angle θ of an original document, and it is expressed by the following expression.

$$\delta = \tan^{-1}(1/(\tan \theta + 1/\tan \theta))$$

As is shown in each of FIGS. 6(a)–6(c), stair H is the number of pixels wherein, when a certain pixel is assumed to be an origin, the pixel being away from the origin in the longitudinal direction by that number in terms of pixels needs to be shifted by an amount equivalent to one pixel in the lateral direction, for the purpose of eliminating an inclination of an image.

Figure 12:
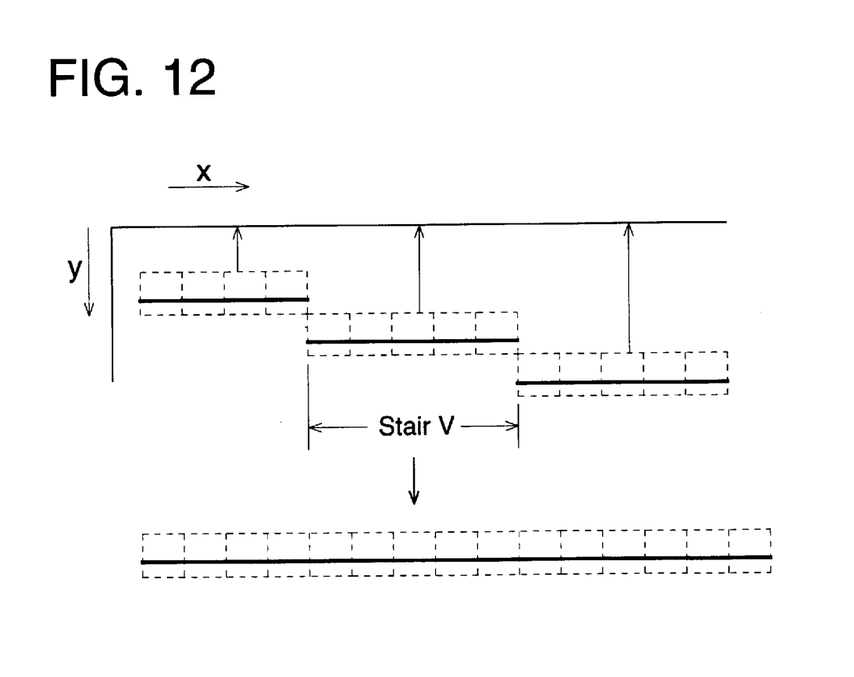
FIG. 12 is a diagram showing illustratively longitudinal interpolation processing.

As shown in FIG. 12, stair V is the number of pixels wherein, when a certain pixel is assumed to be an origin, the pixel being away from the origin in the lateral direction by that number in terms of pixels needs to be shifted by an amount equivalent to one pixel in the longitudinal direction, for the purpose of eliminating an inclination of an image.

Image signals obtained by reading with line sensor 15 are amplified by amplifier 41 and then are converted into digital data by A/D converter 42 to be inputted in image processing device 50. There, after being subjected to image processing such as filtration processing and magnification change processing conducted by image processing section 51 and to inclination correction as well as multiple coding processing conducted by inclination correction processing section 52, the digital data are outputted to printer 60 to be reproduced as an image in the printer 60.

The numeral 53 is CPU for controlling image processing device 50, and it controls the image processing device 50 based on input from inclination detection ROM 80 and on a command of main body CPU representing a control section of the main body. The numeral 30 is an operation section where magnification and image quality can be set.

(2) Inclination Correction Processing

Figure 3A:
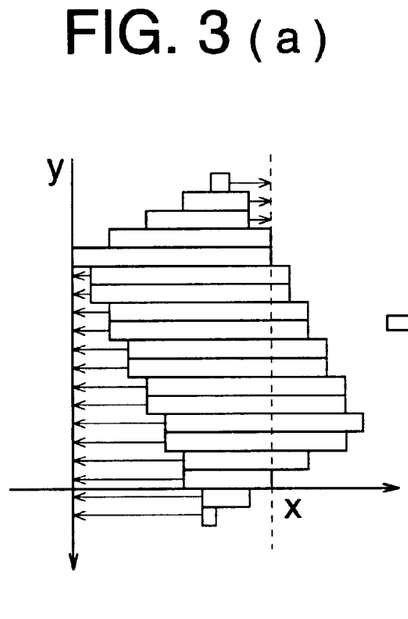
Figure 3B:
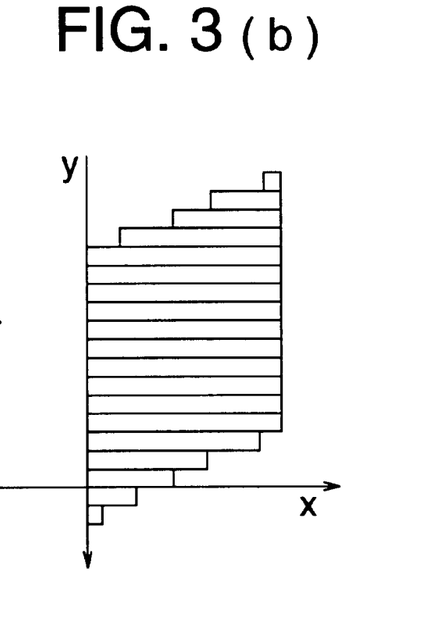
Figure 3C:
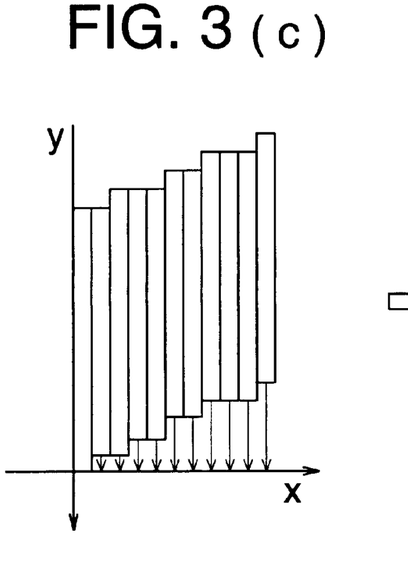
Figure 3D:
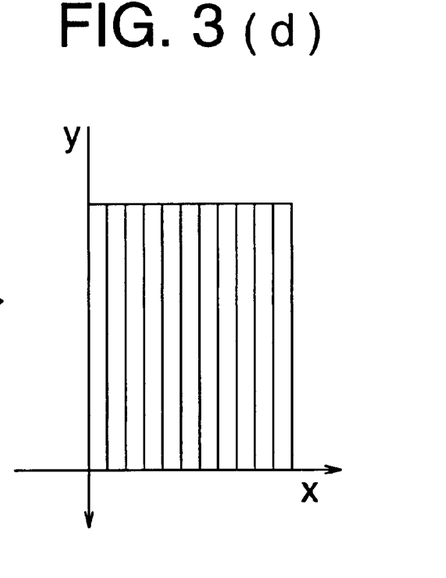

Inclination correction processing conducted in inclination correction processing section 52 will be explained as follows. Contents of this processing include lateral shift correction to shift a group of lateral line data in the lateral direction as shown in FIGS. 3(a) and 3(b) and longitudinal shift correction to shift a group of longitudinal line data in the longitudinal direction as shown in FIGS. 3(c) and 3(d). The lateral shift correction corrects an inclination of longitudinal lines and the longitudinal shift correction corrects an inclination of lateral lines.

Figure 4:
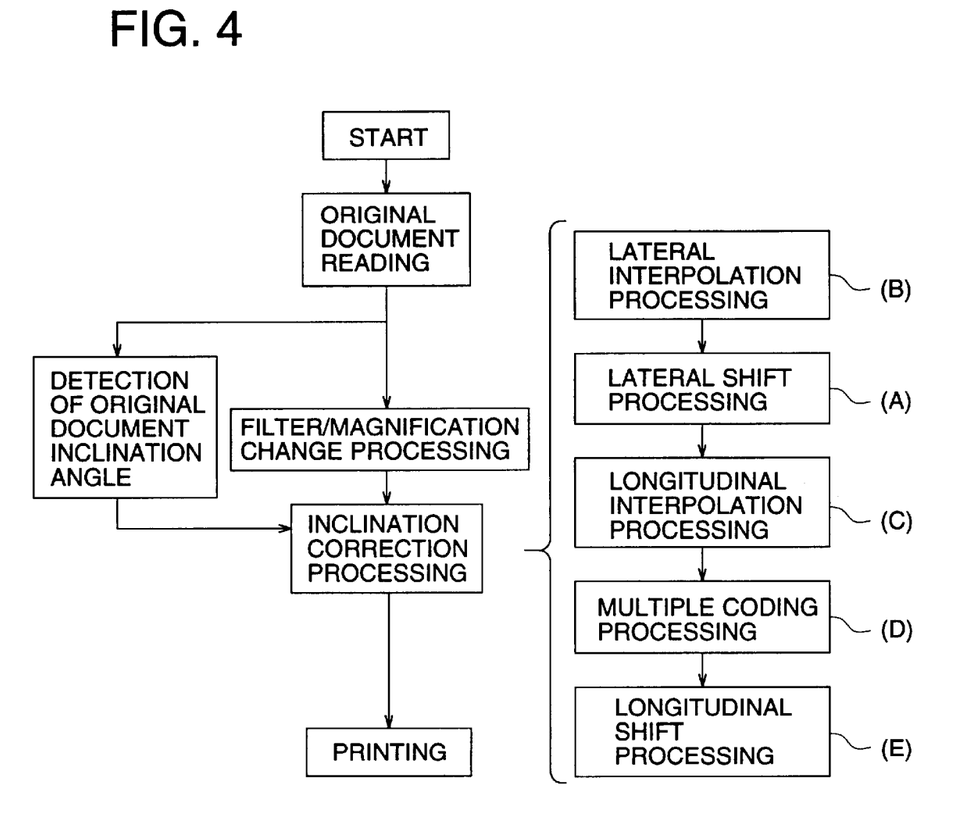
FIG. 4 is a diagram showing processing steps in image processing system shown in FIG. 2.

As shown in FIG. 4, inclination correction processing is conducted in the course of a series of steps of image reading—filtration processing and magnification change processing inclination correction processing—printing, and it is conducted in the flow of lateral interpolation processing—lateral shift processing—longitudinal interpolation processing—multiple coding processing—longitudinal shift processing.

As shown in FIG. 3(a), lateral shift processing is one to shift image data in the lateral direction for each line, and an amount of shifting varies depending upon the position on the axis of ordinates (y-axis). Due to the lateral shift processing, a rectangular image turns into a parallelogram as shown in FIG. 3(b).

Data processing for the lateral shift processing in one wherein image data are shifted on a line memory. Due to the lateral shifting, a rectangle which is inclined from the axis of ordinates is turned into a parallelogram whose two sides are in parallel with the axis of ordinates.

As shown in FIG. 3(c), longitudinal shift processing is one to shift image data longitudinally in the y-axis for each line, and an amount of shifting varies depending upon the position on the axis of abscissas (x-axis). Data processing for the longitudinal shift processing is one wherein image data equivalent to plural lines are stored in a memory, and image data for one line are obtained by outputting image data with delay corresponding to the position on the axis of abscissas. Due to the longitudinal shifting, a parallelogram shown in FIG. 3(c) is turned into a rectangle whose sides are in parallel with the axis of abscissas and the axis of ordinates as shown in FIG. 3(d) so that an image which is not inclined can be obtained.

Each of lateral interpolation processing and longitudinal interpolation processing is processing to correct an error of a pixel value caused by each of the lateral shift processing and the longitudinal shift processing, and this processing is one to correct by means of a weighting average of a pixel value of a looked pixel and a pixel value of a pixel adjoining the looked pixel.

Multiple coding processing is one to reduce the bit number of a pixel value like conversion from 8-bit image to 2-bit image, for example, and it can be conducted by the known multiple coding processing methods such as an error diffusion method and a dither method.

Processing steps shown in FIG. 4 will be explained as follows, and unless otherwise provided, explanation will be made assuming an input image to be of 8-bit. However, there is no limitation about the number of bits provided that the number of bits is 2 bits or more.

As stated above, contents of the inclination correction processing include lateral shift processing (A) and longitudinal shift processing (E), and what requires more memory among these is longitudinal shift processing (E), and it is possible to prevent an increase of circuit size only by positioning the longitudinal shift processing (E) after multiple coding processing (D). In the present embodiment, lateral interpolation processing (B) and longitudinal interpolation processing (C) are conducted to prevent deterioration of image quality which is caused by shift processing. It is preferable that these interpolation processings are conducted prior to multiple coding processing (D) wherein image information is lost, because they are weighting average processing. In order to satisfy the condition to make capacity of a memory for the longitudinal shift processing (E) to be small and the condition to conduct the interpolation processing prior to multiple coding processing (D) as stated above, the longitudinal shift processing (E) alone is positioned after the multiple coding processing in the present embodiment.

Further, since the purpose of the multiple coding processing (D) is to reduce the number of bits for an image, there is no restriction for the number of bits for an input image and for an output image if only the condition that the number of bits for an image is reduced after the multiple coding processing (D) is satisfied. As the multiple coding processing, a multiple coding dither method and a multiple coding error diffusion method are conducted.

Each processing shown in FIG. 4 will be explained in detail as follows.

(A) Lateral Shift Processing

As shown in FIG. 4, lateral shift processing (A) is conducted after lateral interpolation processing (B). However, the lateral shift processing (A) will be explained first to make the explanation easy to understand.

The lateral shift processing (A) is processing to shift a pixel in the main scanning direction in an original document reading, and a concept of the lateral shift processing (A) is shown in each of FIGS. 5(a) and 5(b). As illustrated, the lateral shift processing (A) is correction processing for eliminating inclination of a longitudinal line of an image wherein pixel values are shifted in the lateral direction on the line memory so that aggregate of pixels may be shifted as shown with x1–xn.

When assuming that shx represents the value of pixels by which y-th line needs to be shifted in the lateral direction when an inclination of an original document is represented by θ, shx is expressed by the following expression.

$$shx = y \cdot \tan\theta$$

Incidentally, right or left of the shift is distinguished by signs.

Since shifting can be actually done on a pixel unit basis only, there is used a form of shifting amount ishx in a display of pixel unit in which decimal fraction is cut to be defined as follows.

$$ishx=(int)shx$$

In this case, (int) means to be made integers.

When a coefficient stairH supplied from inclination detection ROM 80 in FIG. 2 is used, the above expression can be expressed as follows.

$$ishx=(int)(y/stairH)$$

Figure 5:
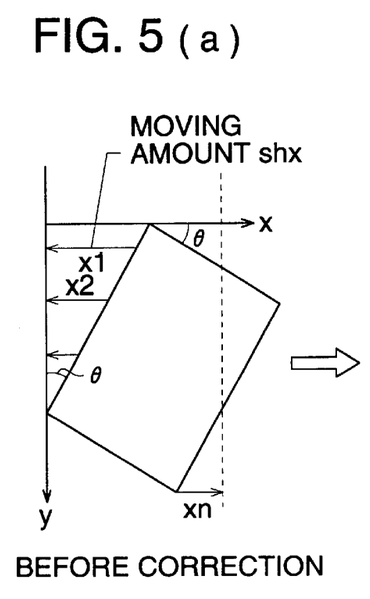

When a pixel value is shifted on the line memory by following the above expression, a rectangle shown in FIG. 5(*a*) is turned into a parallelogram shown in FIG. 5(*b*), and an inclination in the lateral direction is corrected, resulting in, for example, no inclination of longitudinal lines.

(B) Lateral Interpolation Processing

Figure 6:
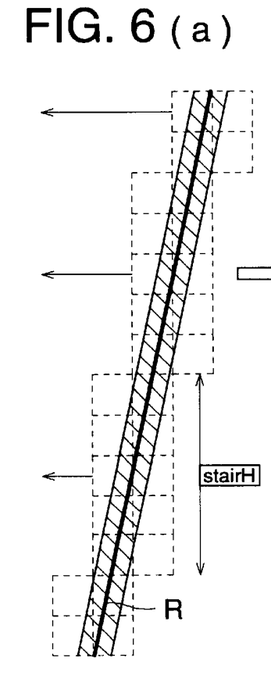

When the lateral shift processing (A) explained above is shown with a pixel unit, it is turned into those shown in FIGS. 6(*a*)–6(*c*). Each of FIGS. 6(*a*) and 6(*b*) illustratively shows the relation between inclined straight line R and pixels. In the drawing, actual image data of an image drawn as straight line R having its thickness are those shown in FIG. 6(*c*) wherein the straight line R has pixel values a, b, c and d each being proportional to an area on each pixel occupied by the straight line R.

Though one vertical line seems to be continuous in the macroscopic view, an inclined line covering two pixels is discontinued at the point where a shifted amount is different on a pixel unit as shown in FIG. 6(*b*). Being caused by this discontinuity, edges and contours seem to be serrated. This is caused by the shifting which is conducted on an integer basis as stated above.

Lateral interpolation processing (B) is processing which corrects deterioration of image quality as that stated above and in this case, weighting average processing with an adjoining pixel is conducted with weighting corresponding to an amount of shifting of decimal fraction which has been cut in the lateral shift processing (A).

Figure 7:
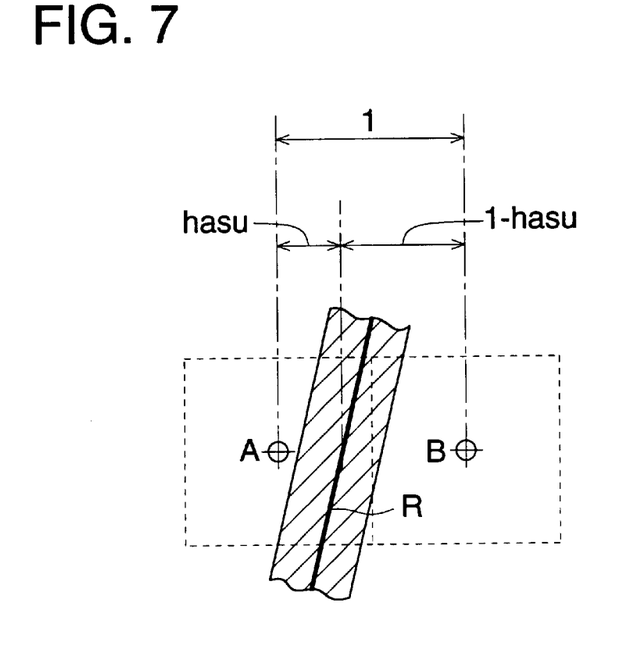
FIG. 7 is a diagram showing a coefficient for lateral interpolation processing illustratively.

First, when assuming that hasu represents a decimal fraction cut in the aforesaid lateral shift processing (A), it is expressed as hasu=shx−ishx, and this is a coefficient for weighting average with an adjoining pixel. A concept of this hasu is as shown in FIG. 7, and hasu is represented by a fraction which is generated when data of y-th line which should be shifted by shx pixel is shifted by ishx pixel. When a looked pixel is represented by A, and its pixel value is $a_{old}$ and a pixel value of pixel B which is adjacent to A at the downstream side in the main scanning direction is $b_{old}$, a pixel value of A is subjected to weighting averaging under the following expression and is updated as $a_{new}$.

$$a_{new}=a_{old}\times(1-hasu)+b_{old}\times hasu \quad (1)$$

Calculation by this expression is calculation of integers for circuit structure. Accordingly, the expression (1) needs to be changed to the form suitable for integer calculation. For this reason, staircount defined in the following expression is used.

$$staircount=int(hasu\times stairH)=y-ishx\times stairH$$

When the aforesaid expression (1) is rewritten by using the staircount defined as stated above, following expression (2) is obtained.

$$a_{new}=a_{old}\times\{(stairH-staircount)/stairH+b_{old}\times staircount/stairH \quad (2)$$

This expression (2) includes division, and when calculating the expression including division by the use of a hardware, considerable scale of circuits are needed. To make the circuit scale to be compact, the expression (2) is changed to the following form.

Denominator stairH varies depending upon an inclination angle of an original document, and if it is possible to rewrite the expression (2) so that the aforesaid variable may be fixed to the specific numbers expressed with two to the nth power such as 2, 4, 8, 16, 32, . . . , simple division utilizing bit shifting can be used, and it is not necessary to increase the scale of gate array circuit which conducts interpolation processing.

Even in this case, when the denominator is greater, a circuit scale needs to be greater, although accuracy of calculation is higher. When the denominator is made small, accuracy of calculation is lowered although the circuit scale is not increased. For example, when the denominator is 8, the rate of weighting is limited to 1/8, 2/8–7/8. Now, to obtain the product representing certain pixel value a multiplied by the aforesaid rate, it has only to combine the results of three divisions including a/2, a/4 and a/8 and to sum up them. The results of these three divisions can simply be obtained by cutting lower 1–3 bits of pixel value "a".

When the specified denominator used for the aforesaid division is generally represented by reso, and when rewriting the weighting rate of staircount/stairH to resocount/reso by using the reso, the resocount can be obtained through the following.

$$resocount=staircount\times reso/|stairH|$$

Though this expression includes division, resocount has only to be calculated for each line, which thereby lessen the load of calculation.

When the aforesaid expression (2) for conducting weighting averaging by using reso and resocount, the following expression is obtained.

$$a_{new}=a_{old}\times\{(reso-resocount)/reso)+b_{old}\times resocount/reso \quad (3)$$

Figure 8:
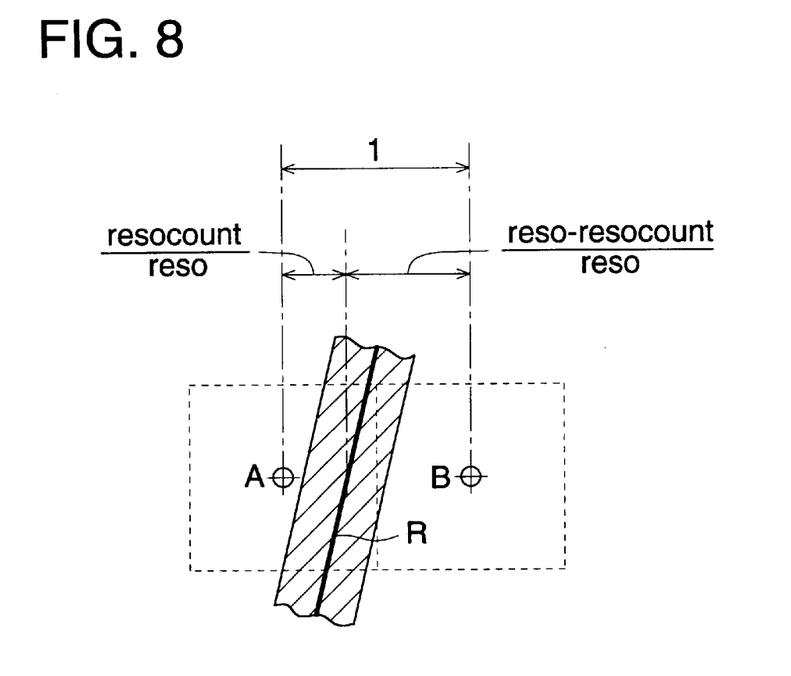
FIG. 8 is a diagram showing a coefficient for lateral interpolation processing illustratively.

Interpolation processing (C) is conducted for each pixel in accordance with expression (3). Incidentally, FIG. 8 shows a concept of the interpolation processing (C) conducted through expression (3).

(C) Longitudinal Interpolation Processing

Figure 9:
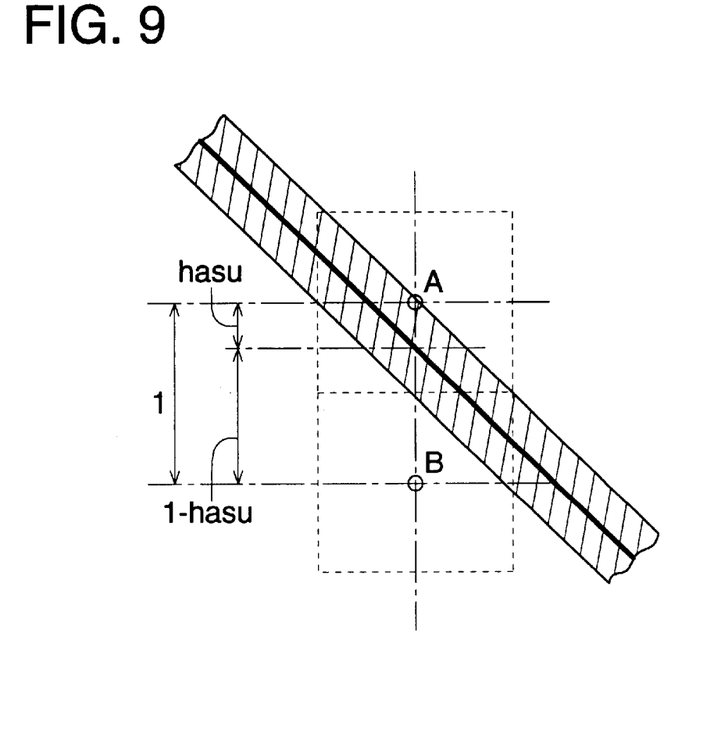
FIG. 9 is a diagram showing a coefficient for longitudinal interpolation processing illustratively.

Longitudinal interpolation processing (C) is processing for correcting a pixel value whose continuity is cut by longitudinal shift processing (E), and it is weighting average processing employing a weighting coefficient shown in FIG. 9.

Calculation in the longitudinal interpolation processing (C) is almost the same as that in the lateral interpolation processing (B) stated above, and coefficient stairV supplied from inclination detection ROM 80 is used in place of stairH. The stairV can be obtained through the following expression.

$$stairV=(int)(1/\tan\theta+\tan\theta)$$

The stairV means that shifting is made by on pixel for each movement of stairV row when conducting longitudinal shift processing (E) for an image which has covered up to lateral shift processing (A), namely for an image having an inclination angle. Incidentally, there is following relation between δ and θ, which has already been explained.

$$1/\tan\delta=\tan\theta+1/\tan\theta$$

Since the longitudinal shift processing (E) is conducted after the longitudinal interpolation processing (C), using of the number of stairV in the longitudinal interpolation processing means that interpolation processing is conducted assuming shift processing for the pixel before being subjected to the shift processing. However, the results are the same though the order of processing operations is reversed.

Even in the longitudinal interpolation processing (C), weighting rate can be expressed by resocount/reso. Therefore, weighting averaged pixel value $a_{new}$ can be obtained through the following expression (4) after obtaining the following.

$$resocount = staircount \times reso/|stairV|$$

$$a_{new} = a_{old} \times \{(reso \times resocount)/reso\} + b_{old} \times resocount/reso \quad (4)$$

However, $b_{old}$ is a pixel value of the pixel which is adjacent downward to the looked pixel.

(D) Multiple Coding Processing

In the present embodiment, 8-bit input signal is multiple-coded to 2-bit (quaternary output). An error diffusion processing in such multiple coding will be explained as follows.

Let it be assumed that a pixel value of looked pixel A is a, threshold values are th1, th2 and th3, an output value is p and an error is er. An output value and an error are obtained under the following judgment standards.

$$p=3, \; er=0 \text{ if } a>th3$$

$$p=2, \; er=a-169 \text{ if } th3>a>th2$$

$$p=1, \; er=a-84 \text{ if } th2>a>th1$$

$$p=0, \; er=a \text{ if } th1>a$$

After that, errors are dispersed to adjoining pixels by using, for example, the following diffusion matrix.

$$*1/4 \; 1/8$$

$$1/8 \; 1/8 \; 1/4 \; 1/8$$

The symbol * represents a looked pixel. Incidentally, as a diffusion matrix, those other than the foregoing can naturally be used.

As threshold values in the aforesaid judgment, the followings, for example, can be used.

$$th1=63$$

$$th2=127$$

$$th3=191$$

Figure 11:
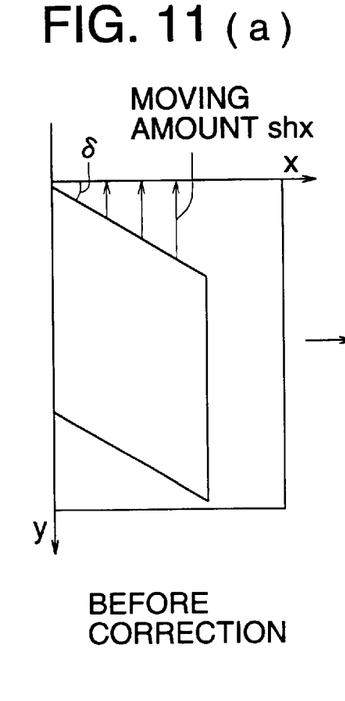

The multiple coding by means of the error diffusion method stated above is conducted for each pixel. FIG. 11 shows the relation between input values and output values in quaternary coding.

Figure 10:
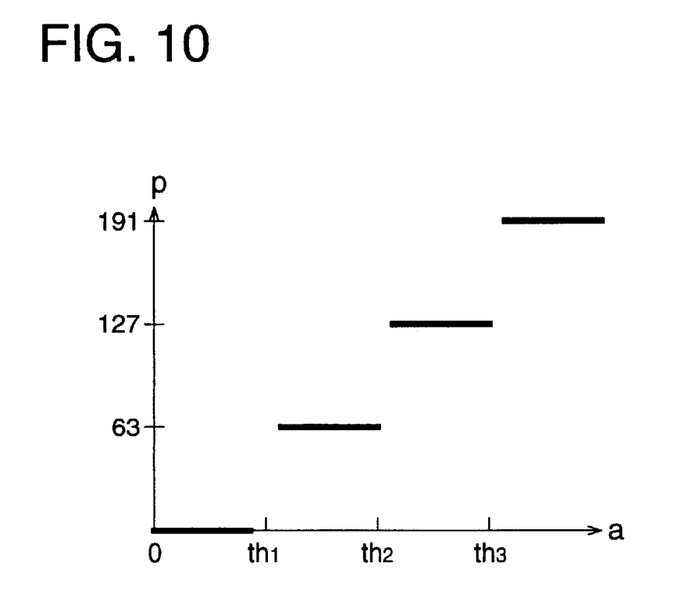
FIG. 10 is a diagram showing the relation between an input and an output in multiple coding processing.

A size of image data was reduced to 1/4 owing to multiple coding processing shown in FIG. 10, namely to the processing to change the bit number of a pixel from 8 to 2. If binary coding is used in place of quaternary coding, a memory capacity of image data is turned into 1/8.

As a multiple coding, known multiple coding methods such as a simple multiple coding method and a dither method can be used in addition to the aforesaid error diffusion method.

(E) Longitudinal Shift Processing

Longitudinal shift processing (E) in the present embodiment is processing for shifting an image in the direction perpendicular to the direction in which the pixel is shifted in the aforesaid lateral shift processing, and the processing is correction to achieve δ=0 for the image inclined from the axis of abscissas by angle δ as shown in FIGS. 11(a) and 11(b). In this correction, there is required, due to lines inclined by angle δ, a memory having capacity to store image data of the number of lines corresponding to the number of pixels covered by lateral lines on the original document extending to the longitudinal direction. However, it is possible to limit the memory capacity to one suitable to be incorporated in the practical apparatus, because the number of data of pixels is reduced by the multiple coding processing as stated above.

Contents of the longitudinal shift processing (E) represent processing wherein images for several lines are stored in a line memory, and when outputting, image data of the number of lines corresponding to pixel position x in the lateral direction are outputted.

When an inclination of an image from the axis of abscissas is assumed to be δ, with regard to the pixel on x-th column, a pixel value of the pixel located downward (or upward) from the looked line by shy lines is outputted. The symbol shy represents a shifting amount in the longitudinal direction. The relation between coordinates value x and shifting amount shy is expressed by the following expression.

$$shy = x \cdot \tan \delta$$

Even in this case, processing is conducted on an integer unit basis. Therefore, ishy wherein shy is turned into an integer is used for the shifting amount, and ishy is expressed by the following expression.

$$ishy = (int)(x/atairV)$$

FIG. 12 shows the longitudinal shift processing expressed on a pixel unit basis, by which the inclination of an original document is corrected as shown in FIGS. 11(a) and 11(b), and correct images are reproduced.

As described in TOKKAIHEI No. 10-336425, due to the lateral shift processing and the longitudinal shift processing stated above, the image is subjected to magnification change wherein magnification in the lateral direction is different from that in the longitudinal direction. For reproducing the image of an original document in a high fidelity basis not only about an angle but also about a shape, it is theoretically necessary to conduct magnification change correction. Actually, however, an inclination of the original document caused in reading is small, and magnification change caused in the shift processing stated above is extremely slight. Therefore, no correction is needed.

In the present invention, serration observed on the contour of the reproduced image caused when correction for the inclination of a original document is conducted by shift processing can be eliminated, and thereby images with high image quality can be obtained. Further, the invention makes it possible to reduce capacity of a memory required for calculation for shift processing.

What is claimed is:

1. An inclination correction device for processing image data inputted on a serial basis and for correcting an inclination of an image of an original document caused each time the image is read while the original document is inclined from a main scanning direction in an image reading apparatus which scans the image in the main scanning direction and in a sub-scanning direction, the inclination correction device comprising:

(a) a lateral interpolation processing means for correcting an error that is smaller than a pixel unit in the main scanning direction, (b) a lateral shift processing means for electrically shifting the image data for each line in the main scanning direction, whereby the inclination of the image in the main scanning direction is corrected;

(c) a longitudinal interpolation processing means for correcting an error that is smaller than a pixel unit in the sub-scanning direction;

(d) a longitudinal shift processing means for electrically shifting the image data for each line in the sub-scanning direction, whereby the inclination of the image in the sub-scanning direction s corrected;

wherein an error correcting operation of the longitudinal interpolation processing means is conducted before a longitudinal shift operation of the longitudinal shift processing means; and (e) a multiple coding means for reducing a bit number of a pixel value, wherein the multiple coding means operates before the longitudinal shift processing means shifts the image data for each line in the sub-scanning direction.

2. The inclination correction device of claim 1, wherein the multiple coding means controls the image data to be multiple coded by an error diffusion method.

3. An image reading apparatus comprising:

(a) an image reading means for reading an image of each original document by scanning the image in a main scanning direction and in a sub-scanning direction;

(b) an image processing means for processing image data inputted from the image reading means on a serial basis and thereby outputting image data for image forming;

(c) a lateral interpolation processing means for correcting an error that is smaller than a pixel unit in the main scanning direction, (d) a lateral shift processing means for electrically shifting the image data for each line in the main scanning direction, whereby the inclination of the image in the main scanning direction is corrected;

(e) a longitudinal interpolation processing means for correcting an error that is smaller than a pixel unit in the sub-scanning direction;

(f) a longitudinal inclination correction means provided in the image processing means for correcting a longitudinal inclination of the image of each original document by electrically shifting the image data for each line in the sub-scanning direction, whereby the inclination of the image in the sub-scanning direct on is corrected, wherein an error correcting operation of the longitudinal interpolation processing means is conducted before a longitudinal shift operation of the longitudinal inclination correction means; and (g) a multiple coding means provided in the longitudinal inclination correction means for reducing a bit number of a pixel value, wherein multiple coding processing by the multiple coding means operates before the longitudinal shift operation by the longitudinal inclination correction means of the image data for each line in the sub-scanning direction is conducted.

4. The inclination correction device of claim 3, wherein the multiple coding means controls the image data to be multiple coded by an error diffusion method.

* * * * *